United States Patent [19]

Andrew et al.

[11] Patent Number: 5,770,006
[45] Date of Patent: Jun. 23, 1998

[54] BUTT FUSION MACHINE FOR MANUFACTURING FULL SIZE SEGEMENTED PIPE TURNS

[75] Inventors: Bill Dean Andrew; Paul Michael Hatch; Richard Leroy Goswick, all of Tulsa; William Joseph Tefft, Claremont, all of Okla.

[73] Assignee: TDW Delaware, Inc., Wilmington, Del.

[21] Appl. No.: 782,374

[22] Filed: Jan. 13, 1997

[51] Int. Cl.$^6$ .................................................. B32B 31/00
[52] U.S. Cl. .................. 156/499; 156/304.2; 156/304.6; 269/111; 269/122; 269/270
[58] Field of Search ............. 156/304.1, 304.2, 156/304.6, 499, 503; 269/88, 104, 107, 111, 122, 268, 270; 285/179, 181, 184

[56] References Cited

U.S. PATENT DOCUMENTS

| | | | |
|---|---|---|---|
| 2,479,580 | 8/1949 | Marco | 285/331 |
| 2,886,262 | 5/1959 | Fletcher | 244/23 R |
| 3,729,360 | 4/1973 | McElroy | 156/499 |
| 3,973,765 | 8/1976 | Babcock | 269/270 X |
| 4,008,118 | 2/1977 | Wesebaum | 156/499 |
| 4,071,395 | 1/1978 | McElroy | 156/499 |
| 4,110,150 | 8/1978 | Ostrowski et al. | 156/499 |
| 4,288,266 | 9/1981 | Konrad et al. | 156/158 |
| 4,640,732 | 2/1987 | Stafford | 156/358 |
| 4,684,430 | 8/1987 | Handa et al. | 156/366 |
| 4,801,349 | 1/1989 | Dommer et al. | 156/503 |
| 4,876,041 | 10/1989 | Hanselka | 264/25 |
| 4,957,570 | 9/1990 | Jenkins et al. | 156/64 |
| 4,981,541 | 1/1991 | Stafford | 156/158 |
| 4,990,209 | 2/1991 | Rakes | 156/351 |
| 5,007,767 | 4/1991 | Stafford | 405/154 |
| 5,037,500 | 8/1991 | Hilpert | 156/503 |
| 5,086,213 | 2/1992 | Nussbaum et al. | 219/535 |
| 5,188,697 | 2/1993 | Lueghamer | 156/499 |
| 5,241,157 | 8/1993 | Wermelinger et al. | 219/243 |
| 5,464,496 | 11/1995 | Wilson et al. | 156/499 |
| 5,505,811 | 4/1996 | Welch et al. | 156/358 |

*Primary Examiner*—David A. Simmons
*Assistant Examiner*—Paul M. Rivard
*Attorney, Agent, or Firm*—Head, Johnson & Kachigian

[57] ABSTRACT

A machine for use in butt fusing in axial alignment plastic pipe having a selected maximum diameter is adaptable by the use of specially designed inserts secured in the lower portions of fixed and moveable clamps, the inserts serving to elevationally raise segments of pipes to be joined when the machine is used to manufacture a segmented pipe turn. In addition to the employment of inserts providing increased height of support for pipe segments, the pivotal upper portions for the fixed and moveable clamps are replaced by specially designed upper clamp portions that have contacting surfaces configured to accept inclined and elevationally upwardly supported pipe segments. By the use of such specially designed inserts and replacement upper clamp portions a butt fusion machine can be employed to manufacture segmented pipe turns of the maximum pipe diameter for which the machine is designed.

1 Claim, 3 Drawing Sheets

BUTT FUSION MACHINE FOR MANUFACTURING FULL SIZE SEGEMENTED PIPE TURNS

BACKGROUND OF THE INVENTION

Thermoplastic pipe has become a popular type of pipe for use in conveying liquids and gases, particularly underground. Much of the gas distribution piping now being installed in the United States and many other countries of the world today for underground burial is formed of thermoplastic pipe. Further, an increasing amount of piping for water and sewage is formed of thermoplastic pipe. Thermoplastic pipe has a great advantage when used for conducting gases and liquids, particularly when buried underground, since it is inert and therefore not subject to corrosion or galvanic action in the earth. An additional and important advantage of thermoplastic pipe is that lengths of pipe can be easily and effectively joined end-to-end by thermal fusion. For this reason butt fusion machines have been developed and perfected for supporting and joining lengths of plastic pipe in axial, end-to-end relationship. The ends of the pipe are faced and then heated. While in a molten state the ends of two lengths of pipe are axially advanced to engage the molten ends and held there until the molten ends solidify, effectively joining the pipes end-to-end. Thermoplastic butt fusion is highly effective in that the tensile and bursting pressure strengths of the joint formed are usually equal to or greater than the tensile and bursting pressure strengths of the plastic pipe itself. Further, butt fusion, since it does not require a coupling of any kind, is economical compared to the costs of threading together, by means of coupling, threaded pipe or the use of solvents to solvent weld plastic pipe to couplings.

When a turn or bend is required in plastic pipe one procedure is to employ manufactured elbows or pipe turns that are cast into a member having planar end portions that can be attached to straight lengths of pipe. While the use of cast or factory formed turns, bends or elbows is practical for smaller diameter pipe, a more serious problem develops for larger diameter pipe, such as pipe having a diameter of 8" and above. For larger diameter pipe a common expedient in use at the present time is to manufacture in the field, segmented pipe turns. Such pipe turns, when they are constructed to complete a turn of 90° are frequently referred to as "elbows". Segmented pipe turns can be produced in the field utilizing a machine of the type commonly employed for butt fusion of pipe wherein short lengths of pipe are held in clamps in such a way that the tubular axii of two short lengths of pipe intersect at an angle. The facing on the pipes is formed so that the ends become planar and paralleled to each other. As an example of an apparatus for creating segmented pipe turns employing thermoplastic pipe, reference is made to U.S. Pat. No. 4,071,395 that issued on Jan. 31, 1978 entitled "Apparatus For Creating Segmented Polyethylene Pipe Turns". This previously issued patent, which is incorporated herein by reference, shows an apparatus for construction of angle fittings of polyethylene pipe by the fusion process including steps for the preparation of short pipe segments both of which faces are cut at a selected angle to the axis of the pipe. Both faces are cut or otherwise formed at the same angle so that the included angle of the two pipes will then have an angle of axii intersection of two times the selected angle. A conventional butt fusion machine which normally holds two pipes coaxially for fusion, is modified to have inserts into the pipe clamps so that the axii of the pipe segments are at the desired angle. When two such segments are clamped in a fixed clamp and a moveable clamp and are brought together, the contiguous faces will be a common plane, will have the same elliptical contour and can be joined by the fusion process. Additional segments can be added to the ends of the short lengths of pipe until a fused multi-segmented pipe turn is obtained having the total angle of turn as required.

Utilizing butt fusion machines of the types illustrated and described in U.S. Pat. No. 4,071,395 have resulted in a standard accepted by the industry wherein the end surfaces of short segments of pipe are formed at an angle of 11.250 with respect to the pipe axis. By joining five of such segments, a pipe turn of 90° is obtained, commonly referred to as an "elbow".

A problem with the existing technology, exemplified by U.S. Pat. No. 4,071,395 is that when a typical butt fusion machine is utilized to make segmented bends, the machine cannot make a segmented bend of a pipe diameter equal to the maximum diameter for which the machine is designed. For instance, if the machine illustrated and described in Pat. No. 4,071,395 is capable of axially butt fusion thermoplastic pipe having a maximum diameter of 8", such machine cannot be used for making a pipe turn of pipe having an 8" diameter. This is due to the fact that with known machines, pipe sections of the maximum machine diameter when secured within the fixed and moveable jaws at an angle with respect to the horizontal, that is at an angle with respect to the normal axis by which lengths of pipe are axially butt welded to each other, interferes with the structure of the butt fusion machine. That is, a pipe of full diameter of which a machine is designed to handle, when positioned at an angle with respect to fixed and moveable jaws, interferes with the operation of the machine so that the pipe segments cannot be freely moved towards and away from each other to accomplish the fusion process necessary to complete a segmented pipe turn.

It is therefore an object of this invention to provide an improved butt fusion machine that can axially fusion weld two lengths of pipe having a maximum diameter of "A" and which can also be used for welding segments of pipe inclined at an angle so that the segments can be formed into pipe turns and elbows, and wherein the segments may have a diameter equal to "A", the full maximum diameter that the butt fusion machine is designed to accept. The end result of the improved butt fusion machine of this invention is that an operator in the field can, using a butt fusion machine designed to fuse in axial alignment pipe of a maximum diameter "A" can also use the same machine for manufacturing a pipe turn utilizing pipe segments of the same maximum diameter.

SUMMARY OF THE INVENTION

The invention provides an improved butt fusion machine which, in its normal application, can be used to fusion weld in axial alignment two lengths of thermoplastic pipe having a maximum diameter "A". In a second method of use of the machine, short segments of thermoplastic pipe can be fused in an angular relationship to create a multisegmented pipe turn or elbows in which the pipe has the same maximum diameter "A".

The butt fusion machine includes a base on which it is supported two fixed clamps spaced apart from each other. Each of the fixed clamps has a base portion and a pivotal upper portion with a screw down handle so that a first length of thermoplastic pipe can be secured by the fixed clamps so that the cylindrical axis of the first pipe is generally horizontal. The frame also supports a pair of spaced apart paralleled guide rods extending in a horizontal plane. The guide rods have first end portions secured to the fixed clamps and opposite end portions supported by the base. Slidably positioned on the guide rods are in tandem, first and second spaced apart moveable clamps. Each of the moveable clamps has a lower base portion and an upper pivoted portion. The upper pivoted portion of the moveable clamps are, like the upper pivoted portions of the fixed clamps, displaced to receive an end portion of a second length of thermoplastic pipe therein after which the upper pivoted portion can be moved into clamping position and the second pipe secured by screw down handles.

The moveable clamps are displaceable, preferably by means of a hydraulic cylinder, towards and away from the fixed clamps so that in normal operation a first length of plastic pipe is held secure in the fixed clamps and a second length of plastic pipe is held in the moveable clamps, the pipes being in axial alignment and the ends of the pipes being moveable towards and away from each other. The normal procedure is that a facer is positioned between the ends of the pipe. The pipes are moved towards each other, that is, the moveable pipe is moved towards the fixed pipe with a facer floating therebetween so that the ends of the two lengths of pipe can be concurrently shaped to be smooth and perpendicular to the tubular axis of each of the pipes. Thereafter a heater is positioned between the pipes and the moveable pipe moved towards the fixed pipe to capture the heater between the pipe end surfaces to bring the end surfaces to molten temperature. After the end surfaces attain a molten temperature, the pipes are separated slightly to remove the heater and thereafter the pipes are moved back towards each other to contact the molten end portions. The pipes are held in such position until the molten end portions cool and solidify, thus thermally fusing or thermally welding the pipes end-to-end.

The machine as described to this point is common of butt fusion machines and each machine is designed to accept a maximum pipe size. For instance, a machine may be designed to accept a maximum pipe size of 6", 8", 12", etc. A butt fusion machine designed to accept as a maximum capacity a 6" pipe obviously cannot accept an 8" pipe.

The machine described to this point can be used to form pipe turns. For this purpose, only the inner two clamps are used, that is, the innermost fixed clamp and innermost moveable clamp. When forming a pipe turn the outermost fixed and outermost moveable clamps are not employed and in which case the upper portion of the outermost fixed clamp and upper portion of the outermost moveable clamp may each be opened to their full opened positions during the manufacture of a pipe turn.

The problem which has developed with existing butt fusion machines when used to manufacture a pipe turn is that when the diameter of the pipe of which the pipe turn is to be made is the maximum diameter for which the butt fusion machine is constructed, interference develops between the ends of the thermoplastic pipe being joined and the butt fusion machine. Consequently, under present commercial practices a segmented pipe turn or elbow can be made utilizing a butt fusion machine only if the diameter of the pipe used in forming the segmented turn is smaller in diameter than the maximum diameter capacity of the butt fusion machine. This limitation can become a serious problem when installing thermoplastic pipe in the field, particularly in remote locations. As an example, if an 8" thermoplastic pipe is being installed in the earth, such as for a gas distribution line that may extend for many miles, utilizing the most practical size butt fusion machine, that is, a butt fusion machine designed to fusion weld pipe having a maximum diameter of 8", and if it becomes necessary to create a segmented turn, the operator, utilizing machines presently available on the market is required to procure a butt fusion machine having a capacity greater than 8", such as a machine designed for a maximum 12" size pipe. This means that in a pipeline construction project which may require a plurality of segmented bends that a contractor is required to have a butt fusion machine available that is larger than that required for normal axially aligned butt fusion operations. This invention overcomes this problem and provides a butt fusion machine wherein an operator can manufacture segmented pipe turns of the maximum diameter size for which the butt fusion machine is designed, thereby eliminating the need to have a larger size butt fusion machine available when a segmented turn is required.

A better understanding of the invention will be obtained from the following description of the preferred embodiment, taken in conjunction with the attached drawings and claims.

DETAILED DESCRIPTION OF THE PREFERRED EMBODIMENTS

Figure 1:
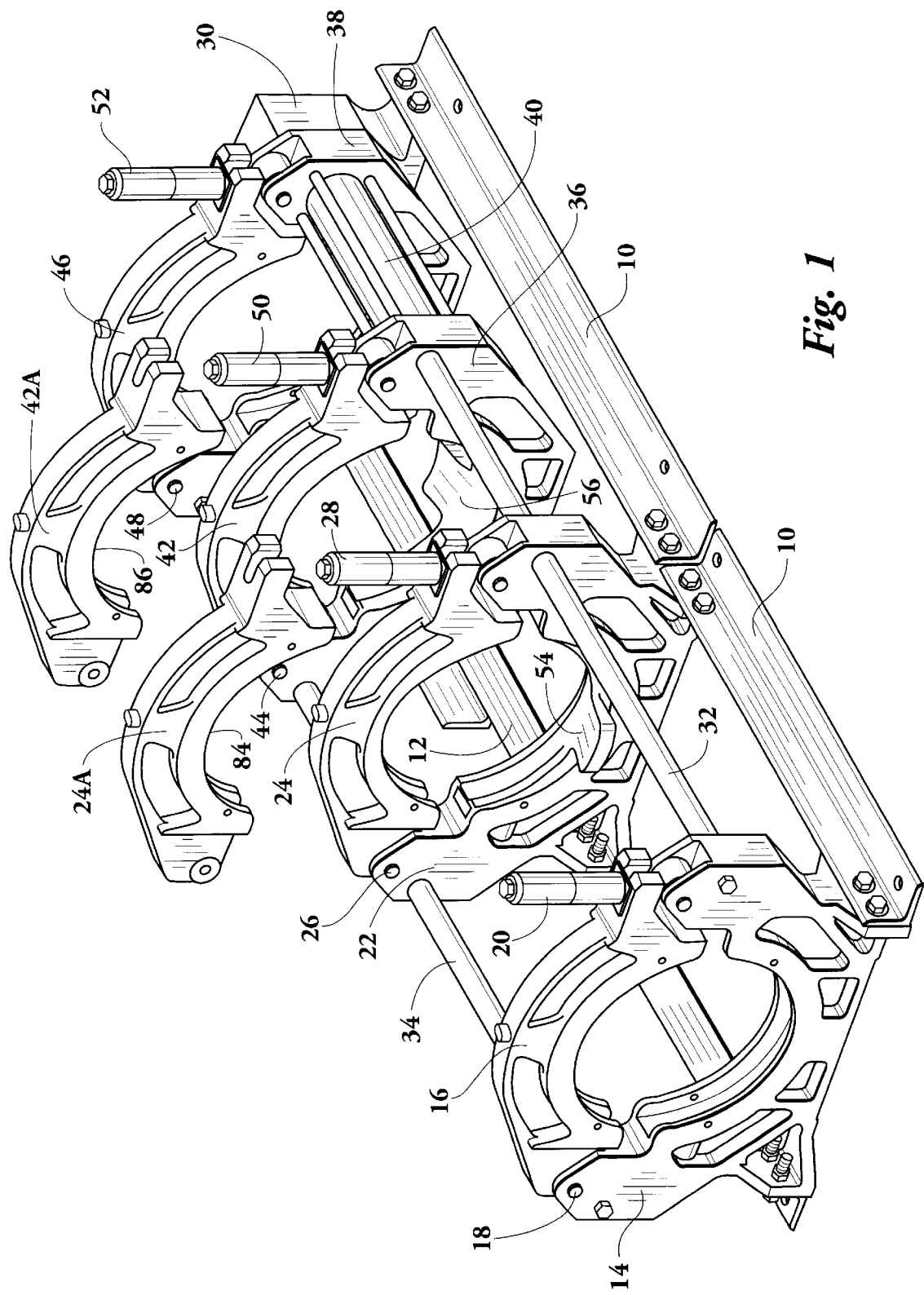
FIG. 1 is an isometric view of a butt fusion machine for joining in axial alignment thermoplastic pipe and which is specifically adapted for manufacturing segmented turns wherein the diameter of the pipe forming the segmented turns can be the same as the maximum diameter for which the butt fusion machine is designed.

Referring to the drawings and first to FIG. 1, the essential elements of a butt fusion machine of this invention is illustrated. The machine includes a frame including opposed frame rails 10 and 12, the frame rails being shown in two segments, however, the frame rails may be unitary on each side of the machine. Affixed at one end of frame rails 10 and 12 is a first fixed clamp having a lower portion 14 and, hinged to it, a first fixed clamp upper portion 16. Upper portion 16 is hinged to lower portion 14 about hinge pin 18 and is removably held in closed position so that it can be locked around a length of pipe by a threaded handle 20. That is, by rotating handle 20 counter-clockwise it can be loosened and then pivoted to disengage from clamp upper portion 16 allowing the upper portion to be moved to fully expose the interior of the clamp lower portion 14.

A second fixed clamp lower portion 22 is secured to frame rails 10 and 12 and is spaced from first fixed clamp lower portion 14. The second fixed clamp has an upper portion 24 that is pivotally supported to the lower portion 22 about a removable hinge pin 26. As was described with reference to the first fixed clamp, the upper clamp 24 is pivotal away from the clamp lower portion 22 when handle 28 is loosened and pivoted to release upper portion 24.

An end bracket 30 is secured to rails 10 and 12 at the end of the rails opposite first fixed clamp lower portion 14. Extending between first fixed clamp lower portion 14 and end bracket 30 are opposed guide rods 32 and 34. The guide rods are not necessarily one piece end to end. The guide rods are also supported by second fixed clamp lower portion 22. Positioned on guide rods 32 and 34 is a first moveable clamp lower portion 36 and, spaced from it, a second moveable clamp lower portion 38. Secured between first and second moveable clamp lower portions 36 and 38 is cylinder 40 which receives guide rod 32. Only the cylinder 40 that is received on guide rod 32 is visible in FIG. 1 however it is understood that a similar cylinder is received on guide rod 34. Within cylinder 40 is a piston (not seen) is affixed to guide rod 32, and a similar piston (not seen) is affixed to guide rod 34. By application of hydraulic fluid pressure to cylinder 40 and its unseen companion, moveable clamp lower portions 36 and 38 can be moved towards or away from fixed clamps lower portions 14 and 22.

Pivotally attached to first moveable clamp lower portion 36 is an upper clamp portion 42 that is supported to the lower clamp portion by a removable hinge pin 44. In like manner, a second moveable clamp upper portion 46 is pivotally secured to second moveable clamp lower portion 38 about removable hinge pin 48. Upper clamp portions 42 and 46 are adjustably retained to the lower clamp portions by means of handles 50 and 52, the functions of which are the same as previously described with reference to handles 20 and 28.

The butt fusion machine illustrated and described up to this point is typical of existing butt fusion machines in commercial use today. The machine is designed primarily for axially joining lengths of thermoplastic pipe. The end portion of a first length of plastic pipe is secured within fixed clamps and the end portion of a second length of plastic pipe is secured within moveable clamps. By hydraulic pressure applied to cylinder 40 and simultaneously to its unseen companion, a pipe secured within moveable clamps can be moved towards and away from a pipe secured within fixed clamps to carry out the well known procedures for axially butt fusing the pipes.

Manufacture of a segmented turn utilizing the machine of FIG. 1 can be accomplished employing the techniques illustrated and described in U.S. Pat. No. 4,071,395, previously identified. However, a standard machine cannot be used to manufacture a segmented turn if the diameter of the pipe segments are that of the maximum diameter for which the machine is designed since the pipe segments interfere with the machine operation.

Figure 3:
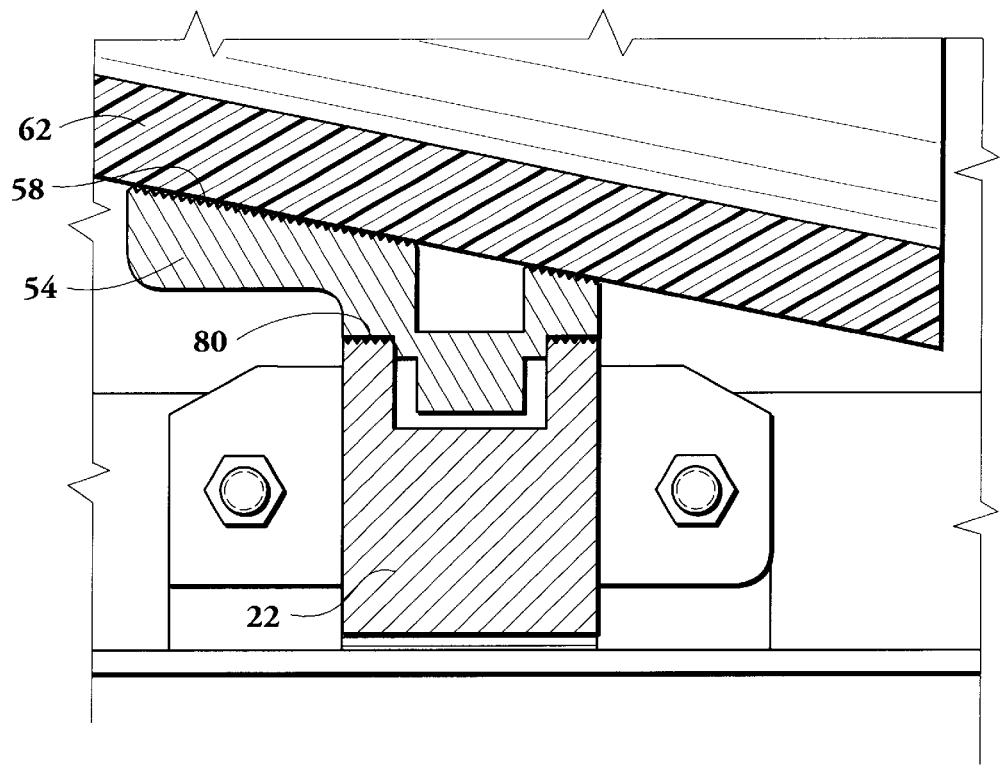
FIG. 3 is an enlarged fragmentary view of the lower portion of the fixed clamp as shown in FIG. 2 and showing more details of the insert therein for supporting a segment of a pipe to be joined in the process of manufacturing a pipe turn.
Figure 4:
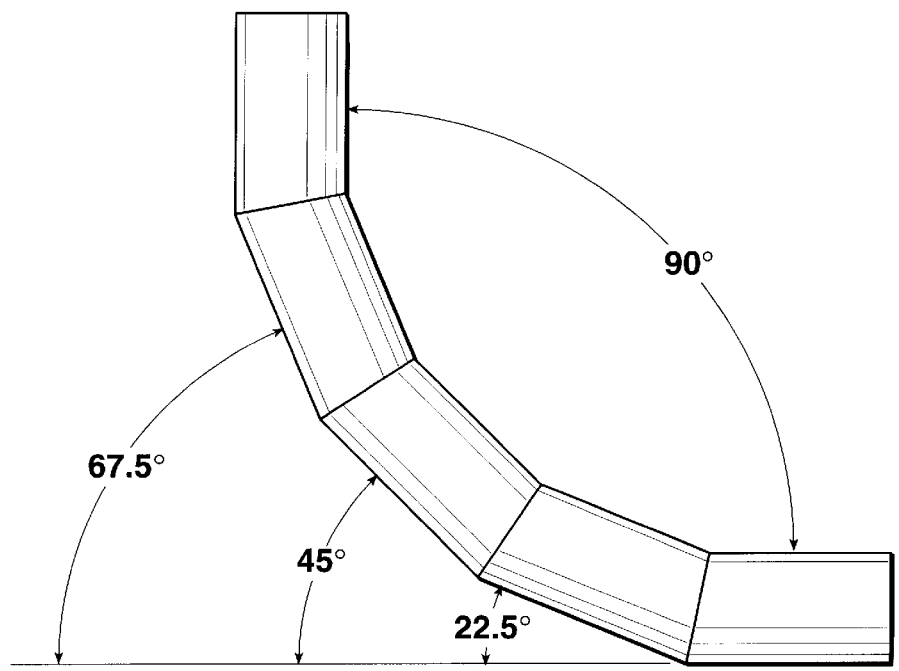
FIG. 4 is a reduced scale view of a segmented pipe turn as can be manufactured with the butt fusion machine illustrated in FIGS. 1 through 3, the segmented turn illustrated having a total turn of 90° and therefore may also be termed an "elbow".

The first step in manufacturing a segmented turn is to provide an angled insert 54 within second fixed clamp lower portion 22 and, in like manner, an angled insert 56 within first moveable clamp lower portion 36. The angled inserts 54 and 56, which are illustrated in cross-sectional view in FIGS. 2 and 3, each have an angled upper surface 58 and 60 respectively that support pipe segments 62 and 64. Pipe segments 62 and 64 have forward faces 66 and 68 that are vertical relative to a horizontal axis 70, the horizontal axis being parallel to the butt fusion frame 10 and 12 and to the axis of pipe received within the fixed and moveable clamps if the pipe is to be axially joined. Inclined surfaces 58 and 60 are at an angle selected according to the segments to be manufactured. It is traditional in forming segmented pipe turns to make the angle between axii 72 and 74 of pipe segments 62 and 64 at an angle with respect to the horizontal, as indicated by the letter "B". As illustrated in FIG. 4, when angle "B" is 11.25°, each two segments joined have axii that intersects at an angle of 22.5°. If three such segments are joined, a turn of 45° is attained. If four segments are joined, a turn of 67.5° is achieved and if five of such segments are joined, a turn of 90° is achieved, that is a right turn, frequently referred to as an "elbow".

Referring back to FIGS. 2 and 3, the angled inserts 54 and 56 utilized to practice the invention are unique and different than those previously employed, primarily in the fact that they provide increased elevation relative to the clamp lower portions 22 and 36 in which the inserts are used. This height is indicated by the letter "C" in FIG. 2. By the use of angled inserts 54 and 56 that are specifically configured to elevate pipe segments 62 and 64 the pipe segments clear the structure of the butt fusion machine so that pipe segments having a diameter of equal to the maximum pipe diameter the machine will accept can be employed.

The use of angle inserts 54 and 56 having increased elevation "C" requires the use of a specially designed second fixed clamp upper portion and a specially designed first moveable clamp upper portion. First fixed clamp upper portion 16 and second moveable clamp upper portion 46 are not employed in manufacturing a segmented pipe turn and these clamp portions may be pivoted fully open so as not to interfere with positioning of the pipe turn as new segments are added.

Figure 2:
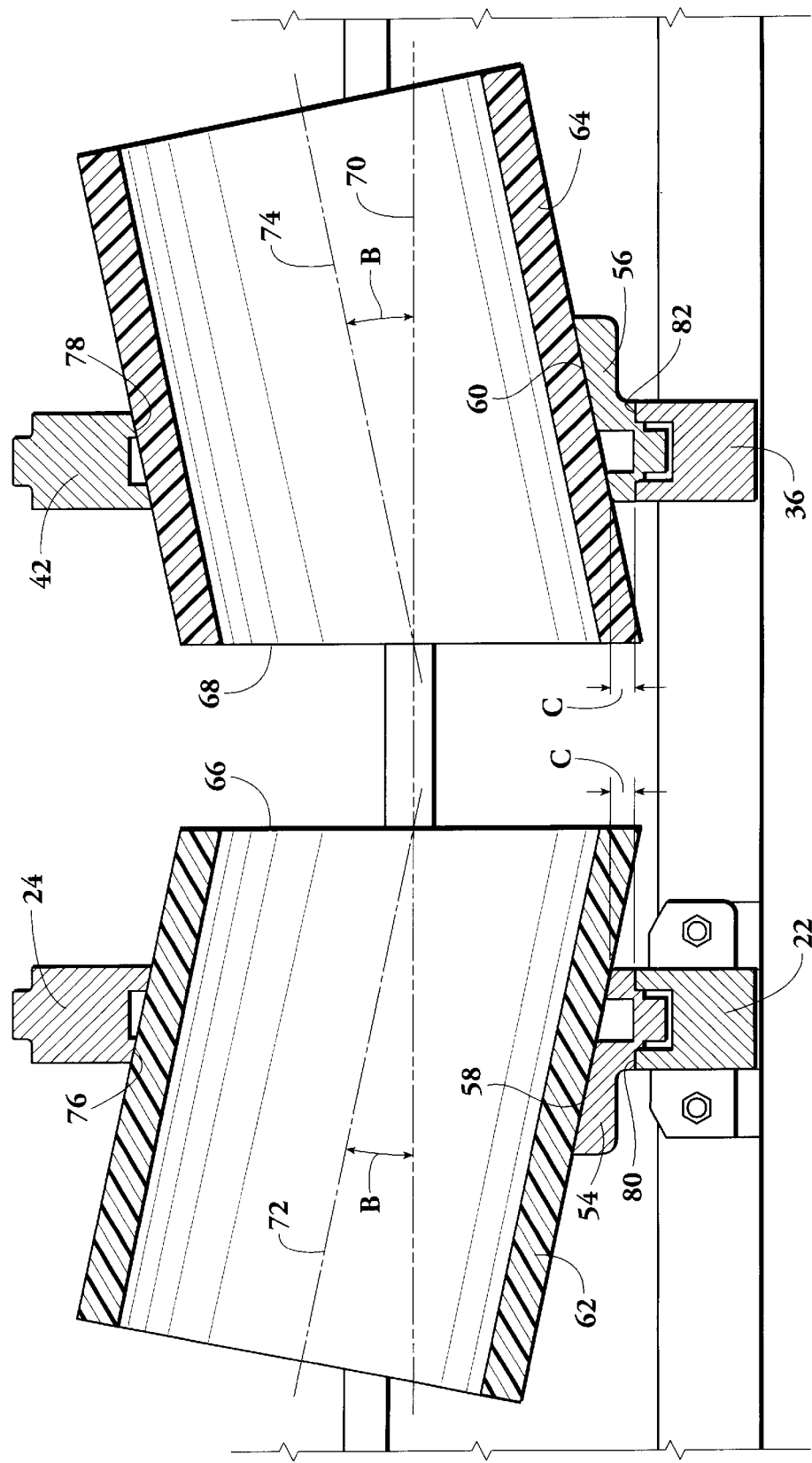
FIG. 2 is an enlarged partial view of the essential elements of the butt fusion machine of FIG. 1 shown in elevational cross-section two short lengths (segments) of thermoplastic pipe supported in a fixed clamp and a moveable clamp and showing the pipes spaced apart such as in position for receiving a facer or a heater therebetween, or, if the end surfaces have been heated to molten temperature for being moved together to fuse the segments.

In FIG. 1, the standard or usual second fixed clamp upper portion is indicated by the numeral 24A and is shown as being removed from the machine to permit replacement with specially configured second fixed clamp upper portion 24 which is modified to adapt to the increased height angled insert 54. In like manner, the standard first moveable clamp upper portion, as identified by the numeral 42A, is shown as having been removed from use in the machine and replaced by the specially designed first moveable clamp upper portion 42. As shown in FIG. 2, second fixed clamp upper portion 24 has an inclined surface 76 and, in like manner, first moveable clamp upper portion 42 has an inclined surface 78. The structure of specially designed second fixed clamp upper portion 24 and first moveable clamp upper portion 42 permit acceptance of pipe segments 62 and 64 that are of the full maximum diameter of which the butt fusion machine is designed.

When the butt fusion machine is employed in the usual practice wherein pipes are joined in axial alignment with each other, the pipes to be joined fit against semi-cylindrical surface 80 of second fixed clamp lower portion 22 and semi-circular cylindrical surface 82 of first moveable clamp lower portion 36. It can be seen that without inserts 54 and 56 and with pipe portions aligned horizontally within the machine that the elevational height of the pipe segments is lowered and that the standard or normally employed second fixed clamp upper portion 24A and first moveable clamp upper portion 42A are used. These clamp upper portions have axial semi-circular surfaces 84 and 86 respectively. When upper clamp portions 24A and 42A are in position, which can be easily interchanged by use of removable hinge pins 26 and 44, semi-circular surface 84 matches semi-cylindrical surface 80 of the lower clamp portion 22 and, in like manner, the semi-circular surface 86 of upper clamp portion 42A matches the semi-cylindrical surface 82 of lower clamp portion 36.

Therefore it can be seen that when the machine is adapted to manufacture a pipe turn using pipe segments of the maximum diameter of which the machine is capable, special angled inserts 54 and 56 are employed that elevationally raise the pipe segments with respect to the framework of the machine. To accommodate this elevational change special upper fixed and moveable portions 24 and 42 are required. Accordingly, the customary clamp upper portions 24A and 42A are temporarily removed when a segmented pipe turn is being manufactured. Thereafter to resume use of the machine for axially butt welding thermoplastic pipe, upper clamp portion 24 is replaced with clamp portion 24A and upper clamp portion 42 with clamp portion 42A.

To manufacture a segmented pipe turn using segments of a diameter less than the maximum diameter which the machine will axially accept does not require the use of specially designed upper clamp portion 24 and 42. Instead, the standard clamp portions 24A and 42A are employed and proper inserts are positioned in the clamp lower portions 22 and 36 and simultaneously proper inserts are positioned in the standard clamp upper portions 24A and 42A.

Stated another way, by the expedient of providing specially designed angled inserts 54 and 56 and specially designed upper clamp portions 24 and 42, a butt fusion machine can be employed to manufacture segmented pipe turns of the full diameter of the pipe that can be axially butt fused in the machine, allowing the same machine to be employed for installing successive axially welded lengths of pipe and for manufacturing segmented turns as required of the same pipe diameter.

The claims and the specification describe the invention presented and the terms that are employed in the claims draw their meaning from the use of such terms in the specification. The same terms employed in the prior art may be broader in meaning than specifically employed herein. Whenever there is a question between the broader definition of such terms used in the prior art and the more specific use of the terms herein, the more specific meaning is meant.

While the invention has been described with a certain degree of particularity, it is manifest that many changes may be made in the details of construction and the arrangement of components without departing from the spirit and scope of this disclosure. It is understood that the invention is not limited to the embodiments set forth herein for purposes of exemplification, but is to be limited only by the scope of the attached claim or claims, including the full range of equivalency to which each element thereof is entitled.

What is claimed is:

1. An improved plastic pipe butt fusion machine comprising:

a frame;

opposed, paralleled horizontal guide rods supported by said frame;

a fixed clamp having a lower fixed clamp portion secured to said frame and a first fixed clamp removable upper portion pivotally secured to said lower fixed clamp portion;

a moveable clamp having a lower moveable clamp portion slidably supported on said guide rods and moveable towards and away from said fixed clamp and a first moveable clamp removable upper portion pivotally secured to said lower moveable clamp portion, said first fixed clamp removable upper portion and said lower fixed clamp portion and said first moveable clamp removable upper portion and said lower moveable clamp portion each having a cylindrical surface adaptable to releasably secure end portions of first and second lengths of thermoplastic pipe in axial alignment, the first and second lengths of pipe having a maximum diameter of "A", said lengths of pipe being supported at a first elevation above said guide rods whereby first and second lengths of pipe can be moved towards and away from each other along a horizontal axis;

a pair of removable insert jaws, one receivable by said lower fixed clamp portion and one receivable by said lower moveable clamp portion in which each has a semi-cylindrical surface having an axis inclined at an angle "B" relative to said horizontal axis;

a second fixed clamp removable upper portion and a second moveable clamp removable upper portion each having a semi-cylindrical surface inclined at said angle "B" relative to said horizontal axis whereby two pipe segments may be supported by said fixed clamp and moveable clamp and may be moved towards and away from each other, whereby two segments of pipe can be fused together with their axii intersecting at an angle of 2B, said removable insert jaws, said second fixed clamp removable upper portion and said second moveable clamp removable upper portion being configured to support pipe segments therebetween at a second elevation above said guide rods that is higher than said first elevation to thereby permit pipe segments of diameter "A" to be fused at an angle of 2B relative to each other.

* * * * *

UNITED STATES PATENT AND TRADEMARK OFFICE
CERTIFICATE OF CORRECTION

PATENT NO. : 5,770,006
DATED : June 23, 1998
INVENTOR(S) : Andrew et al.

It is certified that error appears in the above-identified patent and that said Letters Patent is hereby corrected as shown below:

Cover page, in the title of the invention (appearing after "[54]"), please delete "SEGEMENTED" and substitute --SEGMENTED-- therefor;

Cover page, in list of inventors (part "[75]"), delete "Claremont" and substitute --Claremore-- therefor;

Column 1, line 3, in the title of the invention, delete "SEGEMENTED" and substitute --SEGMENTED-- therefor; and Column 2, line 10, change "11.250" to --11.25°--.

Signed and Sealed this

Eighth Day of September, 1998

Attest:

BRUCE LEHMAN

Attesting Officer     Commissioner of Patents and Trademarks